United States Patent
Rainville et al.

(10) Patent No.: US 8,617,752 B2
(45) Date of Patent: Dec. 31, 2013

(54) COLD START COMPRESSOR CONTROL AND MECHANIZATION IN A FUEL CELL SYSTEM

(75) Inventors: Joseph D. Rainville, Caledonia, NY (US); Bruce J. Clingerman, Palmyra, NY (US); Matthew C. Kirklin, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1102 days.

(21) Appl. No.: 11/684,906

(22) Filed: Mar. 12, 2007

(65) Prior Publication Data

US 2008/0226956 A1 Sep. 18, 2008

(51) Int. Cl.
*H01M 8/06* (2006.01)
*H01M 8/04* (2006.01)

(52) U.S. Cl.
USPC .............................. 429/427; 429/428; 429/429

(58) Field of Classification Search
None
See application file for complete search history.

(56) References Cited

U.S. PATENT DOCUMENTS

| | | | | |
|---|---|---|---|---|
| 6,936,359 | B2* | 8/2005 | Kobayashi et al. | 429/13 |
| 2005/0214605 | A1* | 9/2005 | Saitoh et al. | 429/22 |

* cited by examiner

*Primary Examiner* — Milton I Cano
*Assistant Examiner* — Sarah A Slifka
(74) *Attorney, Agent, or Firm* — Fraser Clemens Martin & Miller LLC; J. Douglas Miller

(57) ABSTRACT

A fuel cell system is disclosed, wherein the fuel cell system is heated by a fluid during a starting operation to mitigate against vapor condensation and ice formation in a fuel cell assembly and to decrease a warm up time of the fuel cell system.

20 Claims, 3 Drawing Sheets

US 8,617,752 B2

COLD START COMPRESSOR CONTROL AND MECHANIZATION IN A FUEL CELL SYSTEM

FIELD OF THE INVENTION

The invention relates generally to a fuel cell system, and more particularly, to a fuel cell system having a fuel cell assembly heated by a fluid in the fuel cell system during a starting operation of the fuel cell system.

BACKGROUND OF THE INVENTION

Fuel cell assemblies convert a fuel and an oxidant to electricity. One type of fuel cell system employs a proton exchange membrane (hereinafter "PEM") to catalytically facilitate reaction of fuels (such as hydrogen) and oxidants (such as oxygen or air) to generate electricity. The PEM is a solid polymer electrolyte membrane that facilitates transfer of protons from an anode to a cathode in each individual fuel cell normally deployed in a fuel cell system.

In a typical fuel cell assembly (stack) within a fuel cell system, individual fuel cell plates include flow channels through which various reactants and cooling fluids flow. In subzero temperatures, water vapor in the fuel cell assembly may condense in the flow channels. Further, the condensate may form ice in the fuel cell assembly. The presence of condensate and ice may affect the performance of the fuel cell assembly and may also cause damage to the fuel cell assembly.

During typical operation of the fuel cell assembly in subzero temperatures, waste heat from the fuel cell reaction heats the fuel cell assembly and mitigates against vapor condensation and ice formation in the assembly. However, during a starting operation or low power operation of the fuel cell assembly in subzero temperatures, water vapor may condense and the condensate may form ice within the fuel cell assembly before the waste heat from the fuel cell reaction heats the fuel cell assembly.

Typical fuel cell assemblies are in cathode fluid communication with a compressor including surge control hardware and software. The compressor increases the pressure of a fluid flowing therethrough by reducing a volume of the fluid within the compressor. Increasing the pressure of the fluid increases the temperature of the fluid. The surge control hardware of the compressor mitigates against compressor surge, or the reverse flow of the fluid through the compressor, caused by a pressure drop or back pressure in the fuel cell assembly. Current fuel cell assemblies having compressor systems use a system bypass valve to reduce the amount of fluid caused to flow to the fuel cell assembly. The bypass valve facilitates obtaining a desired fluid pressure to mitigate against compressor surge. The fluid caused to flow through the bypass valve is purged to a vehicle exhaust system.

The fluid purged to the environment from the exhaust system of the fuel cell system is also a concern. Unconsumed hydrogen ($H_2$) is the most important emission consideration from the fuel cell system of the vehicle. The hydrogen exiting the vehicle must be kept below a lower flammability limit (LFL) of approximately 4% molar concentration of hydrogen in air. If the exhaust from the fuel cell assembly is above 4% molar concentration of hydrogen, the fuel cell assembly can be operated at increased airflows to dilute the hydrogen in the exhaust stream. Operating the fuel cell assembly at an increased stack airflow may dry out the fuel cell assembly.

It would be desirable to produce a fuel cell system heated by a fluid in the fuel cell system during a starting operation to mitigate against vapor condensation and ice formation in a fuel cell assembly and to decrease a warm up time of the fuel cell system.

SUMMARY OF THE INVENTION

Concordant and congruous with the present invention, a fuel cell system heated by a fluid in the fuel cell system during a starting operation to mitigate against vapor condensation and ice formation in a fuel cell assembly and to decrease a warm up time of the fuel cell system has surprisingly been discovered.

In one embodiment, a fuel cell system comprises a fuel cell assembly in fluid communication with an exhaust system; a compressor adapted to compress and heat a first fluid; a heat exchanger disposed between and in fluid communication with said compressor and said fuel cell assembly; and a first means for regulating flow in fluid communication with said heat exchanger, wherein said first means for regulating flow facilitates a flow of at least a portion of the first fluid from said heat exchanger to said compressor.

In another embodiment, a fuel cell system comprises, a fuel cell assembly in fluid communication with an exhaust system; a compressor adapted to compress and heat a first fluid; a charge air cooler disposed between and in fluid communication with said compressor and said fuel cell assembly; and a first means for regulating flow in fluid communication with said charge air cooler, wherein said first means for regulating flow facilitates a flow of at least a portion of the first fluid from said charge air cooler to said compressor.

The invention also provides a method of heating a fuel cell assembly that comprises the steps of providing a compressor adapted to compress and heat a first fluid; providing a heat exchanger disposed between and in fluid communication with the compressor and the fuel cell assembly; providing a first means for regulating flow in fluid communication with the heat exchanger and an inlet of the compressor; causing the first fluid to flow from the compressor and through the heat exchanger; causing a second fluid to flow through the heat exchanger to control a temperature of the first fluid exiting the heat exchanger; selectively causing at least a portion of the first fluid to flow from the heat exchanger back to the compressor using the first means for regulating flow to control a temperature of the first fluid entering the compressor; causing a portion of the first fluid to flow from the heat exchanger through the first means for regulating flow and to the compressor; permitting the remaining portion of the first fluid to flow from the heat exchanger to the fuel cell assembly to heat the fuel cell assembly and mitigate against vapor condensation and ice formation in the fuel cell assembly.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. It is understood that materials other than those described can be used without departing from the scope and spirit of the invention. In respect of the methods disclosed, the steps presented are exemplary in nature, and thus, the order of the steps is not necessary or critical.

Figure 1:
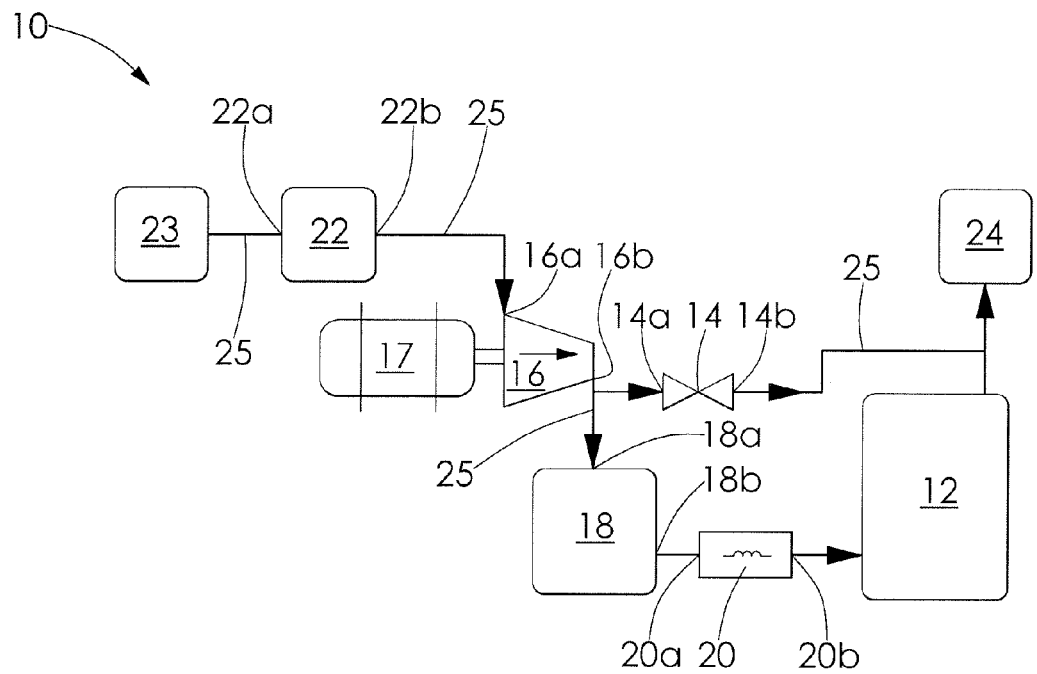
FIG. 1 is a schematic flow diagram of a fuel cell system according to the prior art.

FIG. 1 shows a fuel cell system 10 according to the prior art. The fuel cell system 10 is typically used in fuel cell powered vehicles (not shown). The fuel cell system 10 includes a fuel cell assembly 12, a first means for regulating flow 14, a compressor 16, a heat exchanger 18, a mass flow meter 20, and a filter 22. System conduit 25 is in communication with the system components as described herein, and the system conduit 25 facilitates the flow of a first fluid from one component of the fuel cell system 10 to another.

The fuel cell assembly 12 is in fluid communication with an outlet 20b of the mass flow meter 20 and an exhaust system 24. In the prior art embodiment shown in FIG. 1, the fuel cell assembly 12 is a PEM fuel cell assembly. It is understood that other fell cell types can be used as desired.

Figure 4:
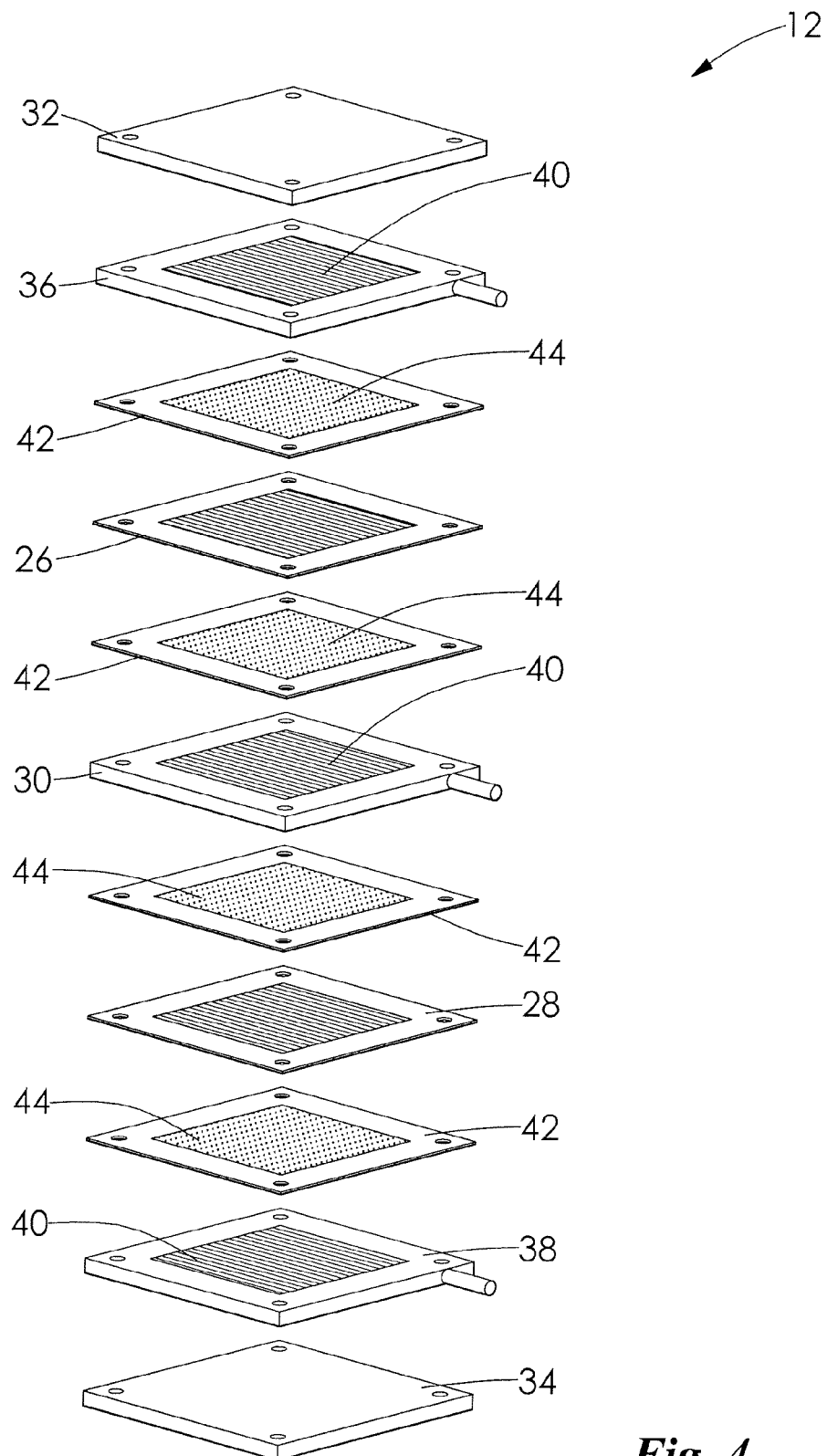
FIG. 4 is an exploded perspective view of a PEM fuel cell assembly, showing two fuel cells, illustrative of the fuel cell assemblies shown in FIGS. 1-3.

FIG. 4 is an exploded view illustrative of the fuel cell assembly 12, including two fuel cells. It is understood that the number of fuel cells in the fuel cell assembly 12 may vary. As shown, the fuel cell assembly 12 has a pair of membrane electrode assemblies (MEA) 26 and 28 separated from each other by an electrically conductive fuel distribution element 30, hereinafter a bipolar plate. The MEAs 26, 28 and bipolar plate 30 are stacked together between stainless steel clamping plates or end plates 32, 34 and end contact elements 36, 38. The end contact element 36 is a cathode, while the end contact element 38 is an anode. The end contact elements 36, 38, as well as both working faces of the bipolar plate 30, contain a plurality of grooves or channels 40 for distributing fuel and oxidant gases (i.e. hydrogen and oxygen) to the MEAs 26, 28. The bipolar plate 30 may be made from metal but the plate 30 can also be manufactured from other materials, if desired. For example, bipolar plates may be fabricated from graphite or other conductive composites which are lightweight, corrosion resistant, and electrically conductive in the environment of a PEM fuel cell assembly 12.

The fuel cell assembly 12 also includes diffusion media 44 that include a flange 42. The flanges 42 of the diffusion media 44 provide seals and insulation between components of the fuel cell assembly 12. One of the diffusion media 44 is disposed between the end contact element 36 and the MEA 26. One of the diffusion media 44 is disposed between the MEA 26 and an anode side of the bipolar plate 30 and another diffusion medium 44 is disposed between a cathode side of the bipolar plate 30 and the MEA 28. Yet another diffusion medium 44 is disposed between the MEA 28 and the end contact element 38. It is understood that the fuel cell assembly 12 may include any number of fuel cells and the components of the fuel cell assembly 12 may be formed from any conventional materials. Further, the fuel cell assembly 12 may be any conventional fuel cell assembly including a reformed methanol fuel cell, an alkaline fuel cell, and a solid oxide fuel cell, for example.

The first means for regulating flow 14 includes an inlet 14a and an outlet 14b. In the prior art embodiment shown in FIG. 1, the first means for regulating flow 14 is a flow control valve, although other flow regulating devices can be used such as a globe valve, a ball valve, a positive displacement pump, or a centrifugal pump, for example. The first means for regulating flow 14 is disposed between the compressor 16 and the exhaust system 24. The inlet 14a of the first means for regulating flow 14 is in fluid communication with an outlet 16b of the compressor 16. The outlet 14b of the first means for regulating flow 14 is in fluid communication with the exhaust system 24.

The compressor 16 includes an inlet 16a and the outlet 16b. In the embodiment shown the compressor 16 is a centrifugal air compressor. The inlet 16a of the compressor 16 is in fluid communication with an outlet 22b of the filter 22 and the outlet 16b of the compressor 16 is in fluid communication with an inlet 18a of the heat exchanger 18. The compressor 16 may be any conventional means for compressing a fluid such as turbomachine, centrifugal, mixed flow, blower or fan compressor, for example. In the embodiment shown, the compressor 16 is operated by a motor 17.

The heat exchanger 18 shown in FIG. 1 includes the inlet 18a and an outlet 18b. The inlet 18a of the heat exchanger 18 is in fluid communication with the outlet 16b of the compressor 16, and the outlet 18b of the heat exchanger 18 is in fluid communication with an inlet 20a of the mass flow meter 20. In the embodiment shown, the heat exchanger 18 is a charge air cooler. It is understood that any conventional heat exchanger may be used such as a shell and tube heat exchanger, an air-cooled heat exchanger, or other heat exchanger device, as desired.

The mass flow meter 20 includes the inlet 20a and the outlet 20b. The inlet 20a of the mass flow meter 20 is in fluid communication with the outlet 18b of the heat exchanger 18, and the outlet 20b of the mass flow meter 20 is in fluid communication with the fuel cell assembly 12. It is understood that a volumetric flow meter or no flow meter may be used, as desired. The mass flow meter 20 may be a curved tube flow meter or straight tube flow meter, as desired.

The filter 22 includes an inlet 22a and the outlet 22b. The inlet 22a is in fluid communication with the first fluid from a fluid source 23, and the outlet 22b of the filter 22 is in fluid communication with the inlet 16a of the compressor 16. In the embodiment shown the filter 22 is an air filter, the first fluid is air, and the fluid source 23 is ambient air. It is understood that the air filter 22 may be a paper filter, a foam filter, a cotton filter, or other fluid filtering device, as desired. It is also understood that the first fluid may be pure oxygen ($O_2$), compressed oxygen or air, cryogenic oxygen or air, or other fluid, as desired. Also, the fluid source 23 may be a fluid storage tank or other vessel adapted to store a fluid, as desired.

In use, the first fluid is caused to flow from the fluid source 23, through the system conduit 25, and to the inlet 22a of the filter 22. As the first fluid passes through the filter 22, contaminants such as pollen, dust, mold, bacteria, chemicals and dirt are removed from the first fluid. The filtered first fluid is then caused to flow through system conduit 25 to the inlet 16a of the compressor 16. In the compressor 16, the volume of the first fluid is reduced to increase the pressure and temperature thereof.

As the first fluid exits the outlet 16b of the compressor 16, a portion of the first fluid is selectively caused to flow through the system conduit 25 to the inlet 14a of the first means for regulating flow 14. The portion of the first fluid selectively flows through the first means for regulating flow 14 from the compressor 16 to maintain a desired pressure in the compressor 16 to mitigate against compressor surge. The portion of the first fluid flows through the outlet 16b of the compressor 16, through the first means for regulating flow 14, and to the exhaust system 24. A remaining portion of the first fluid is caused to flow through system conduit 25 to the inlet 18a of the heat exchanger 18.

In the heat exchanger 18, the first fluid passes through sealed passageways (not shown) inside the heat exchanger 18, while a second fluid is caused to flow across the passageways. The second fluid may be air, a coolant, water, or other fluid, as desired. The second fluid may cool or heat the first fluid in the heat exchanger 18. The first fluid will be cooled by the second fluid during low power operation of the fuel cell system 10 and during a start up operation of the fuel cell system 10. When the fuel cell system 10 is at an elevated temperature, approximately 65° F. or higher, the first fluid from the outlet 16b of the compressor 16 may be below a temperature of the fuel cell assembly 12. Accordingly, the first fluid stream may absorb energy and be heated in heat exchanger 18. Upon exiting the heat exchanger 18, the first fluid is caused to flow to the inlet 20a of the mass flow meter 20. In the mass flow meter 20, the amount of the first fluid flowing to the fuel cell assembly 12 is measured. The first fluid is then caused to flow through a cathode side of the fuel cell assembly 12 to facilitate the catalytic reaction within the fuel cell assembly 12 to generate electricity. Unused first fluid is then caused to flow out of the fuel cell assembly 12 and to the exhaust system 24 and is removed from the fuel cell system 10.

Figure 2:
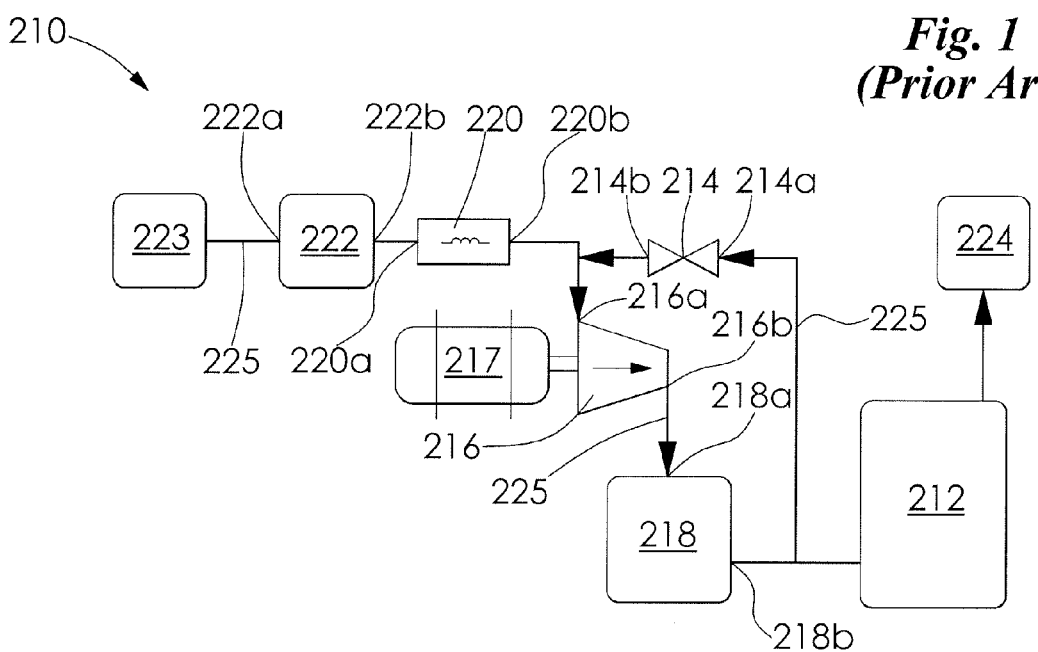
FIG. 2 is a schematic flow diagram of a fuel cell system according to an embodiment of the invention.

FIG. 2 shows a fuel cell system 210 according to an embodiment of the invention. The fuel cell system 210 is used in fuel cell powered vehicles. The fuel cell system 210 includes a fuel cell assembly 212, a first means for regulating flow 214, a compressor 216, a heat exchanger 218, a mass flow meter 220, and a filter 222. System conduit 225 is in communication with the system components as described herein. The system conduit 225 facilitates the flow of a first fluid from one component of the fuel cell system 210 to another.

The fuel cell assembly 212 is in fluid communication with an outlet 220b of the mass flow meter 220 and an exhaust system 224. The fuel cell assembly 212 shown in FIG. 2 is a PEM fuel cell assembly. The fuel cell assembly 212 is similar to the fuel cell assembly 12 described above and illustrated in FIG. 4. It is understood that the fuel cell assembly 212 may include any number of fuel cells and may be formed from any conventional materials. Further, the fuel cell assembly 212 may be any conventional fuel cell assembly including a reformed methanol fuel cell, an alkaline fuel cell, and a solid oxide fuel cell, for example.

The first means for regulating flow 214 includes an inlet 214a and an outlet 214b. In the embodiment shown in FIG. 2, the first means for regulating flow 214 is a bypass valve. The first means for regulating flow 214 is disposed between the heat exchanger 218 and the compressor 216. The inlet 214a of the first means for regulating flow 214 is in fluid communication with an outlet 218b of the heat exchanger 218. The outlet 214b of the first means for regulating flow 214 is in fluid communication with an inlet 216a of the compressor 216. The first means for regulating flow 214 may be any conventional fluid controlling device such as a globe valve, a ball valve, a positive displacement pump, or a centrifugal pump, for example.

The compressor 216 includes the inlet 216a and an outlet 216b. In the embodiment shown the compressor 216 is a centrifugal air compressor. The inlet 216a of the compressor 216 is in fluid communication with an outlet 220b of the mass flow meter 220 and the outlet 214b of the first means for regulating flow 214. The outlet 216b of the compressor 216 is in fluid communication with an inlet 218a of the heat exchanger 218. The compressor 216 may be any conventional means for compressing a fluid such as scroll compressor or a diaphragm compressor, for example. In the embodiment shown, the compressor 216 is operated by a motor 217.

The heat exchanger 218 shown in FIG. 2 includes the inlet 218a and an outlet 218b. The inlet 218a of the heat exchanger 218 is in fluid communication with the outlet 216b of the compressor 216, and the outlet 218b of the heat exchanger 218 is in fluid communication with the fuel cell assembly 212 and the inlet 214a of the first means for regulating flow 214. In the embodiment shown, the heat exchanger 218 is a charge air cooler. It is understood that any conventional heat exchanger may be used such as a shell and tube heat exchanger, an air-cooled heat exchanger, or other heat exchange device, as desired.

The mass flow meter 220 includes an inlet 220a and the outlet 220b. The inlet 220a of the mass flow meter 220 is in fluid communication with an outlet 222b of the filter 222, and the outlet 220b of the mass flow meter 220 is in fluid communication with the inlet 216a of the compressor 216. It is understood that a volumetric flow meter or no flow meter may be used, as desired. The mass flow meter 220 may be a curved tube flow meter or straight tube flow meter, as desired.

The filter 222 includes an inlet 222a and the outlet 222b. The inlet 222a is in fluid communication with a fluid from a fluid source 223, and the outlet 222b of the filter 222 is in fluid communication with the inlet 220a of the mass flow meter 220. In the embodiment shown the filter 222 is an air filter, the fluid is air, and the fluid source 223 is ambient air. It is understood that the air filter 222 may be a paper filter, a foam filter, a cotton filter, or other fluid filtering device, as desired. It is also understood that the fluid may be pure oxygen ($O_2$), compressed oxygen or air, cryogenic oxygen or air, or other fluid, as desired. Also, the fluid source 223 may be a fluid storage tank or other vessel adapted to store a fluid, as desired.

In use, the fluid is caused to flow from the fluid source 223 through system conduit 225 to the inlet 222a of the filter 222. As the fluid passes through the filter 222 contaminants such as pollen, dust, mold, bacteria, chemicals and dirt are removed from the fluid. The filtered fluid is then caused to flow through system conduit 225 to the inlet 220a of the mass flow meter 220. In the mass flow meter 220, the amount of the fluid flowing to the compressor 216 from the fluid source 223 is measured. The fluid is then caused to flow from the outlet 220b of the mass flow meter 220 to the inlet 216a of the compressor 216. In the compressor 216 the volume of the fluid is reduced to increase a pressure and temperature thereof.

Next, the fluid is caused to flow from the outlet 216b of the compressor 216 through the system conduit 225 to the inlet 218a of the heat exchanger 218. In the heat exchanger 218, the fluid passes through sealed passageways (not shown) inside the heat exchanger 218. A second fluid is caused to flow across the passageways. The second fluid may be air, a coolant, water, or other fluid, as desired. The second fluid may cool or heat the fluid in the heat exchanger 218. The fluid is typically cooled by the second fluid during low power operation of the fuel cell system 210 and during a start up operation of the fuel cell system 210. When the fuel cell system 210 is at an elevated temperature, typically around 65° F. or higher, the fluid from the outlet 216b of the compressor 216 may be below a temperature of the fuel cell assembly 212. Accordingly, the fluid stream may absorb energy and be heated in heat exchanger 218. As the fluid exits the outlet 218b of the heat exchanger 218, a portion of the fluid is selectively caused to flow through the system conduit 225 to the inlet 214a of the first means for regulating flow 214. The fluid then flows through the outlet 214b of the first means for regulating flow 214 and rejoins the flow of the fluid from the outlet 220b of the mass flow meter 220 entering into the inlet 216a of the compressor 216. A remaining portion of the fluid exiting the heat exchanger 218 is then caused to flow through the system conduit 225 to the fuel cell assembly 212. The fluid is then caused to flow through a cathode side of the fuel cell assembly 212 to facilitate the catalytic reaction within the assembly 212 to generate electricity. Unused fluid is then caused to flow out of the fuel cell assembly 212 and to the exhaust system 224, and is exhausted from the fuel cell system 210.

Because the portion of the fluid flowing through the first means for regulating flow 214 has been heated by the compressor 216, when the fluid is caused to mix with the flow of fluid from the outlet 220b of the mass flow meter 220 the temperature and pressure of the fluid flowing into the compressor 216 is increased. As the temperature and pressure of the fluid entering the compressor 216 increases, the temperature and pressure of the fluid exiting the compressor 216 also increases, thereby resulting in an increase in energy entering the heat exchanger 218 and the fuel cell assembly 212 and minimizing a required time to warm up the fuel cell assembly 212. A minimized warm up time allows the compressor 216 to run at a lower power state, drawing less electric power, allowing the system to warm up with higher efficiency. The minimized time to warm up the fuel cell assembly 212 minimizes the amount of time it takes for a vehicle (not shown) powered by the fuel cell system 210 powered vehicle (not shown) to be able to be driven away and increases the heat available for a passenger cabin (not shown) of the vehicle.

Another advantage of the fuel cell system 210 over the prior art fuel cell system 10 is that the mass flow meter 220 is in fluid communication with the inlet 216a of the compressor 216 and not in communication with the outlet 218b of the heat exchanger 218, thereby removing the mass flow meter 220 from a high pressure and high temperature fluid flow. A further advantage of the fuel cell system 210 over the prior art fuel cell system 10 is that the first means for regulating flow 214 is in fluid communication with the outlet 218b of the heat exchanger 218, while the first means for regulating flow 14 is in fluid communication with the outlet 16b of the compressor 16. By moving the first means for regulating flow 214 to the outlet 218b of the heat exchanger 218, the fluid caused to flow through the first means for regulating flow 214 is at a reduced temperature, whereas the fluid exiting the compressor 16 of the prior art fuel cell system 10 has an increased temperature. During the initial system 310 cold start, the heat exchanger 318 temperature is below the fluid leaving the compressor outlet 316b. The air temperature leaving the heat exchanger outlet 318b is reduced as the heat energy from the air stream transfers into the heat exchanger 318. The lower air temperature into the inlet of the first means for regulating flow 314a is preferred over the warmer temperature because lower convective heat losses occur to ambient in the system conduit 325 and the first means for regulating 314.

Figure 3:
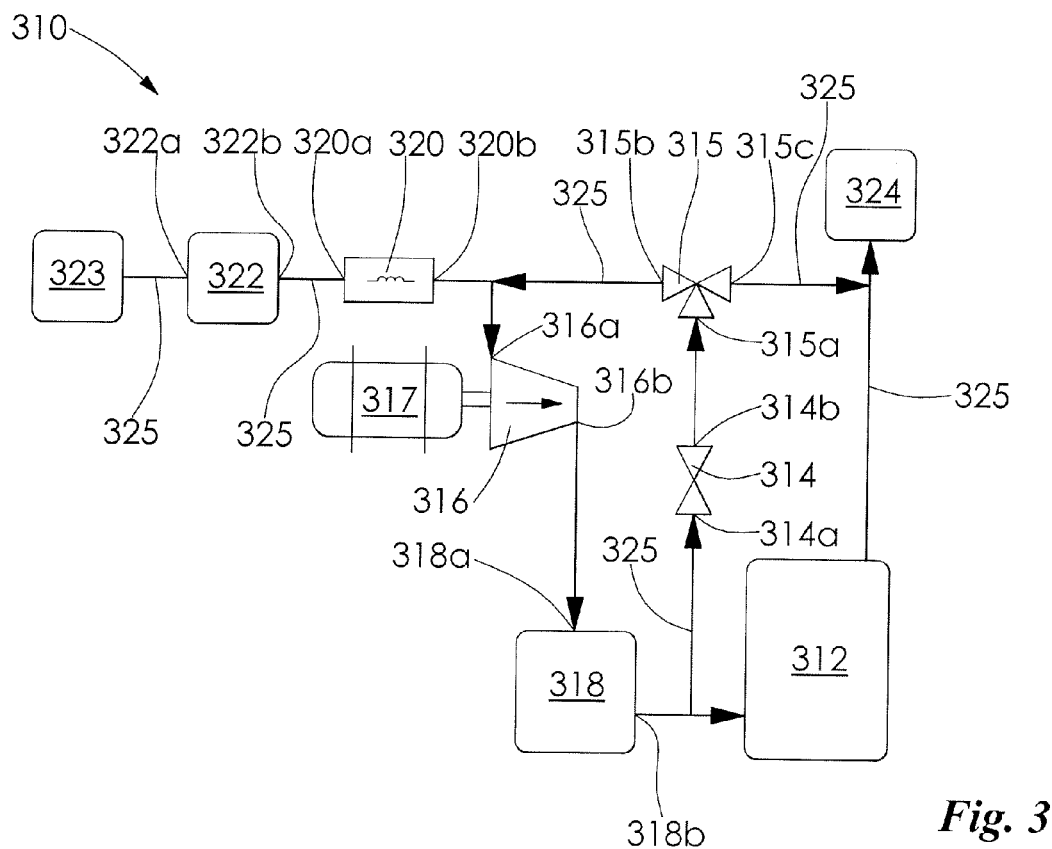
FIG. 3 is a schematic flow diagram of a fuel cell system according to another embodiment of the invention.

FIG. 3 shows a fuel cell system 310 according to another embodiment of the invention. The fuel cell system 310 is typically used in fuel cell powered vehicles (not shown). The fuel cell system 310 includes a fuel cell assembly 312, a first means for regulating flow 314, a second means for regulating flow 315, a compressor 316, a heat exchanger 318, a mass flow meter 320, and a filter 322. A system conduit 325 is in communication with the system components as described herein, and the system conduit 325 facilitates the flow of a first fluid from one component of the fuel cell system 310 to another.

The fuel cell assembly 312 is in fluid communication with an outlet 320b of the mass flow meter 320 and an exhaust system 324. The fuel cell assembly 312 shown in FIG. 3 is a PEM fuel cell assembly. The fuel cell assembly 312 is similar to the fuel cell assembly 12 described above and illustrated in FIG. 4. It is understood that the fuel cell assembly 312 may include any number of fuel cells and may be formed from any conventional materials. Further, the fuel cell assembly 312 may be any conventional fuel cell assembly including a reformed methanol fuel cell, an alkaline fuel cell, and a solid oxide fuel cell, for example.

The first means for regulating flow 314 includes an inlet 314a and an outlet 314b. In the embodiment shown in FIG. 3, the first means for regulating flow 314 is a bypass valve. The first means for regulating flow 314 is disposed between the compressor 316 and the second means for regulating flow 315. The inlet 314a of the first means for regulating flow 314 is in fluid communication with an outlet 318b of the heat exchanger 318. The outlet 314b of the first means for regulating flow 314 is in fluid communication with an inlet 315a of the second means for regulating flow 315. The first means for regulating flow 314 may be any conventional fluid regulating device such as a globe valve, a ball valve, a positive displacement pump, or a centrifugal pump, for example.

The second means for regulating flow 315 includes the inlet 315a and a first outlet 315b, and a second outlet 315c. In the embodiment shown in FIG. 3, the second means for regulating flow 315 is a three-way valve. The inlet 315a of the second means for regulating flow 315 is in fluid communication with the outlet 314b of the first means for regulating flow 314. The first outlet 315b of the second means for regulating flow 315 is in fluid communication with an inlet 316a of the compressor 316. The second outlet 316c of the second means for regulating flow 315 is in fluid communication with the exhaust system 324. The second means for regulating flow 315 may be any conventional fluid regulating device adapted to selectively cause the fluid flowing through the second means for regulating flow 315 to flow to a plurality of destinations.

The compressor 316 includes the inlet 316a and an outlet 316b. In the embodiment shown, the compressor 316 is a centrifugal air compressor. The inlet 316a of the compressor 316 is in fluid communication with an outlet 320b of the mass flow meter 320 and the outlet 315b of the second means for regulating flow 315. The outlet 316b of the compressor 316 is in fluid communication with an inlet 318a of the heat exchanger 318. The compressor 316 may be any conventional means for compressing a fluid such as turbomachine, centrifugal, mixed flow, blower or fan compressor, for example. In the embodiment shown, the compressor 316 is operated by a motor 317.

The heat exchanger 318 shown in FIG. 3 includes the inlet 318a and an outlet 318b. The inlet 318a of the heat exchanger 318 is in fluid communication with the outlet 316b of the compressor 316, and the outlet 318b of the heat exchanger 318 is in fluid communication with the fuel cell assembly 312 and the inlet 314a of the first means for regulating flow 314. In the embodiment shown, the heat exchanger 318 is a charge air cooler. It is understood that any conventional heat exchanger may be used such as a shell and tube heat exchanger, an air-cooled heat exchanger, or other heat exchange device, as desired.

The mass flow meter 320 includes an inlet 320a and the outlet 320b. The inlet 320a of the mass flow meter 320 is in fluid communication with an outlet 322b of the filter 322, and the outlet 320b of the mass flow meter 320 is in fluid communication with the inlet 316a of the compressor 316. It is understood that a volumetric flow meter or no flow meter may be used, as desired. The mass flow meter 320 may be a curved tube flow meter or straight tube flow meter, as desired.

The filter 322 includes an inlet 322a and the outlet 322b. The inlet 322a is in fluid communication with a fluid from a fluid source 323, and the outlet 322b of the filter 322 is in fluid communication with the inlet 320a of the mass flow meter 320. In the embodiment shown the filter 322 is an air filter, the fluid is air, and the fluid source 323 is ambient air. It is understood that the air filter 322 may be a paper filter, a foam filter, a cotton filter, or other fluid filtering device, as desired. It is also understood that the fluid may be pure oxygen ($O_2$), compressed oxygen or air, cryogenic oxygen or air, or other fluid, as desired. Also, the fluid source 323 may be a fluid storage tank or other vessel adapted to store a fluid, as desired.

In use, the fluid is caused to flow from the fluid source 323 through system conduit 325 to the inlet 322a of the filter 322. As the fluid passes through the filter 322 contaminants such as pollen, dust, mold, bacteria, chemicals and dirt are removed from the fluid. The filtered fluid is then caused to flow through system conduit 325 to the inlet 320a of the mass flow meter 320. In the mass flow meter 320, the amount of the fluid flowing to the compressor 316 from the fluid source 323 is measured. The fluid is then caused to flow from the outlet 320b of the mass flow meter 320 to the inlet 316a of the compressor 316. In the compressor 316, the volume of the fluid is reduced to increase a pressure and temperature thereof.

Next, the fluid is caused to flow from the outlet 316b of the compressor 316 through the system conduit 325 to the inlet 318a of the heat exchanger 318. In the heat exchanger 318, the fluid passes through sealed passageways (not shown) inside the heat exchanger 318, while a second fluid is caused to flow across the passageways. The second fluid may be air, a coolant, water, or other fluid, as desired. The second fluid may cool or heat the fluid in the heat exchanger 318. The fluid is typically cooled by the second fluid during low power operation of the fuel cell system 310 and during a start up operation of the fuel cell system 310. When the fuel cell system 310 is at an elevated temperature, typically about 65° F. or higher, the fluid from the outlet 316b of the compressor 316 may be below a temperature of the fuel cell assembly 312. Accordingly, the fluid stream may absorb energy and be heated in heat exchanger 318. As the fluid exits the heat exchanger 318, a portion of the fluid is selectively caused to flow through the system conduit 325 to the inlet 314a of the first means for regulating flow 314. The fluid then flows through the outlet 314b of the first means for regulating flow 314 to the inlet 315a of the second means for regulating flow 315. A remaining portion of the fluid exiting the heat exchanger 318 is caused to flow through the system conduit 325 to the fuel cell assembly 312. The fluid is then caused to flow through a cathode side of the fuel cell assembly 312 to facilitate the catalytic reaction within the assembly 312 to generate electricity. Unused fluid is then caused to flow out of the fuel cell assembly 312 and to the exhaust system 324 and is exhausted from the fuel cell system 310.

The portion of the fluid flowing to the second means for regulating flow 315 is caused to selectively flow to the first outlet 315b and the second outlet 315c. The fluid caused to flow through the first outlet 315b joins the flow of the fluid from the outlet 320b of the mass flow meter 320 entering into the inlet 316a of the compressor 316. The fluid caused to flow through the second outlet 315c of the second means for regulating flow 315 is mixed with the flow of fluid from the fuel cell assembly 312 to the exhaust system 324 and is exhausted from the fuel cell system 310.

Because the portion of the fluid flowing through the first means for regulating flow 314 has been heated by the compressor 316, when the portion of the fluid from the outlet 315b of the second means for regulating flow 315 is caused to mix with the flow of fluid from the outlet 320b of the mass flow meter 320, the temperature and pressure of the fluid flowing into the compressor 316 is increased. As the temperature and pressure of the fluid entering the compressor 316 increases, the temperature and pressure of the fluid exiting the compressor 316 also increases, thereby resulting in an increase in energy entering the heat exchanger 318 and the fuel cell assembly 312 and facilitating a minimization of a time to warm up the fuel cell assembly 312. A minimized warm up time allows the compressor 316 to be run at a lower power state, drawing less electric power allowing the system to warm up with higher efficiency. The minimization of time required to warm up the fuel cell assembly 312 minimizes the amount of time it takes for a vehicle (not shown) powered by the fuel cell system 310 powered vehicle (not shown) to be able to be driven away and increases the heat available for a passenger cabin (not shown) of the vehicle.

The portion of the fluid flowing through the outlet 315c of the second means for regulating flow 315 is caused to flow to the exhaust system 324, thereby increasing the volume of fluids in the exhaust and facilitating a dilution of the hydrogen concentration. A controller (not shown) adjusts the second means for regulating flow 315 in response to the fuel cell system 310 requirements. The controller determines a desired amount of the fluid required for dilution of hydrogen in the exhaust system 324, if any. If the amount of hydrogen in the exhaust system 324 is above the lower flammability limit of 4% molar concentration, the outlet 315c of the second means for regulating flow 315 is opened to permit the fluid to flow to the exhaust system 324. If the hydrogen being emitted to the exhaust system 324 is below the lower flammability limit, the controller causes the outlet 315c to close and causes all of the flow of fluid through the second means for regulating flow 315 to flow to the inlet 316a of the compressor 316.

Another advantage of the fuel cell system 310 over the prior art fuel cell system 10 is that the mass flow meter 320 is in fluid communication with the inlet 316a of the compressor 316 and not in communication with the outlet 318b of the heat exchanger 318, thereby removing the mass flow meter 320 from a high pressure and high temperature fluid flow. A further advantage of the fuel cell system 310 over the prior art fuel cell system 10 is that the first means for regulating flow 314 is in fluid communication with the outlet 318b of the heat exchanger 318, while the first means for regulating flow 14 is in fluid communication with the outlet 16b of the compressor 16. By moving the first means for regulating flow 314 to the outlet 318b of the heat exchanger 318, the fluid caused to flow through the first means for regulating flow 314 is at a reduced temperature whereas the fluid exiting the compressor 16 of the prior art fuel cell system 10 has an increased temperature. During the initial system 310 cold start, the heat exchanger 318 temperature is below the fluid leaving the compressor outlet 316b. The air temperature leaving the heat exchanger outlet 318b is reduced as the heat energy from the air stream transfers into the heat exchanger 318. The lower air temperature into the inlet of the first means for regulating flow 314a is preferred over the warmer temperature because lower convective heat losses occur to ambient in the system conduit 325 and the first means for regulating flow 314.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fuel cell system comprising:
a fuel cell assembly;
a compressor upstream of said fuel cell assembly, wherein said compressor includes an inlet in fluid communication with a source of fluid, said compressor adapted to compress and heat a first fluid;
a heat exchanger disposed between and in fluid communication with an outlet of said compressor and an inlet of said fuel cell assembly, wherein the first fluid flows from the source of fluid into said compressor prior to flowing into said heat exchanger and said fuel cell assembly, and wherein the first fluid flow from an outlet of said heat exchanger is divided into a first portion and a second portion, wherein the first portion of the first fluid flow is caused to flow to the inlet of said fuel cell assembly; and
a first means for regulating flow in fluid communication with an outlet of said heat exchanger, wherein said first means for regulating flow selectively facilitates a flow of the second portion of the first fluid flow from the outlet of said heat exchanger to an inlet of said compressor.

2. The fuel cell system of claim 1, further comprising an exhaust system in fluid communication with an outlet of said fuel cell assembly.

3. The fuel cell system of claim 2, wherein said first means for regulating flow selectively facilitates a flow of a third portion of the first fluid flow to flow therethrough to said exhaust system.

4. The fuel cell system of claim 2, further comprising a second means for regulating flow in fluid communication with an outlet of said first means for regulating flow, the inlet of said compressor, and said exhaust system.

5. The fuel cell system of claim 4, wherein said second means for regulating flow is a three-way valve.

6. The fuel cell system of claim 1, wherein said heat exchanger is in direct fluid communication with the outlet of said compressor and the inlet of said fuel cell assembly.

7. The fuel cell system of claim 1, wherein said heat exchanger is a charge air cooler.

8. The fuel cell system of claim 1, further comprising a mass flow meter in fluid communication with the inlet of said compressor.

9. A fuel cell system comprising:
an exhaust system;
a fuel cell assembly having a cathode side inlet and a cathode side outlet in fluid communication with said exhaust system;
a compressor upstream of said fuel cell assembly having an inlet in fluid communication with a source of fluid, said compressor adapted to compress and heat a first fluid;
a heat exchanger disposed between and in direct fluid communication with an outlet of said compressor and the cathode side inlet of said fuel cell assembly, wherein the first fluid flows from the source of fluid into said compressor prior to flowing into said fuel cell assembly and said heat exchanger, and wherein the first fluid flow from an outlet of said heat exchanger is divided into a first portion and a second portion, wherein the first portion of the first fluid flow is caused to flow to the cathode side inlet of said fuel cell assembly; and
a first means for regulating flow in fluid communication with the outlet of said heat exchanger, wherein said first means for regulating flow selectively facilitates a flow of the second portion of the first fluid flow from the outlet of said heat exchanger to the inlet of said compressor.

10. The fuel cell system of claim 9, wherein said first means for regulating flow selectively facilitates a flow of a third portion of the first fluid flow to flow therethrough to said exhaust system.

11. The fuel cell system of claim 9, further comprising a second means for regulating flow in fluid communication with an outlet of said first means for regulating flow, the inlet of said compressor, and said exhaust system.

12. The fuel cell system of claim 11, wherein said second means for regulating flow is a three-way valve.

13. The fuel cell system of claim 9, wherein said first means for regulating flow is a bypass valve.

14. The fuel cell system of claim 9, wherein said heat exchanger is a charge air cooler.

15. The fuel cell system of claim 9, further comprising a mass flow meter in fluid communication with the inlet of said compressor.

16. A fuel cell system comprising:
an exhaust system;
a fuel cell assembly having a cathode side outlet in fluid communication with said exhaust system;
a compressor upstream of said fuel cell assembly, wherein said compressor includes an inlet in fluid communication with a source of fluid, said compressor adapted to compress and heat a first fluid flowing from the source of fluid prior to a flow of the first fluid into said fuel cell assembly;
a heat exchanger disposed between and in direct fluid communication with an outlet of said compressor and an inlet of said fuel cell assembly, wherein the first fluid flow from an outlet of said heat exchanger is divided into a first portion and a second portion, wherein the first portion of the first fluid flow is caused to flow to the inlet of said fuel cell assembly; and
a first means for regulating flow of the first fluid from the source of fluid prior to flowing into said fuel cell assembly, said fuel cell assembly in fluid communication with the outlet of said heat exchanger, wherein said first means for regulating flow selectively facilitates a flow of the second portion of the first fluid flow from the outlet of said heat exchanger to the inlet of said compressor and
a flow of a third portion of the first fluid flow from the outlet of said heat exchanger to said exhaust system bypassing said fuel cell assembly.

17. The fuel cell system of claim 16, further comprising a second means for regulating flow in fluid communication with an outlet of said first means for regulating flow, the inlet of said compressor, and said exhaust system.

18. The fuel cell system of claim 16, wherein said first means for regulating flow is a three-way valve.

19. The fuel cell system of claim 16, wherein said heat exchanger is a charge air cooler.

20. The fuel cell system of claim 16, further comprising a mass flow meter in fluid communication with the inlet of said compressor.

* * * * *